United States Patent [19]

Nakamura et al.

[11] Patent Number: 5,139,711
[45] Date of Patent: Aug. 18, 1992

[54] PROCESS OF AND APPARATUS FOR MAKING THREE DIMENSIONAL OBJECTS

[75] Inventors: Yoshimitsu Nakamura, Settsu; Yoshiyuki Uchinono, Yawata; Yoshikazu Higashi, Kadoma, all of Japan

[73] Assignee: Matsushita Electric Works, Ltd., Osaka, Japan

[21] Appl. No.: 627,859

[22] Filed: Dec. 17, 1990

[30] Foreign Application Priority Data

Dec. 25, 1989 [JP] Japan .................................. 1-337722
Aug. 27, 1990 [JP] Japan .................................. 2-225860

[51] Int. Cl.$^5$ .......................... B29C 35/08; B29C 41/02
[52] U.S. Cl. .................................... 264/22; 118/423;
118/428; 118/429; 118/500; 118/620;
156/273.5; 156/275.5; 156/307.1; 156/379.6;
156/538; 250/432 R; 250/492.1; 264/308;
425/174.4; 427/53.1; 427/54.1; 427/430.1
[58] Field of Search .............. 264/22, 308; 425/174.4;
156/242, 273.3, 273.5, 275.5, 307.1, 379.6, 538;
427/53.1, 54.1, 430.1; 118/423, 428, 429, 500,
620; 250/432 R, 492.1; 364/468, 476, 522, 523;
365/106, 107, 119, 120, 126, 127; 430/270, 327,
328

[56] References Cited

U.S. PATENT DOCUMENTS 4,961,154 10/1990 Pomerantz et al. ................. 364/522
4,961,886 10/1990 Eckstein et al. ...................... 264/22

FOREIGN PATENT DOCUMENTS

61-114817 6/1986 Japan .
63-141724 6/1988 Japan .
1-228827 9/1989 Japan .................................. 264/22

Primary Examiner—Leo B. Tentoni
Attorney, Agent, or Firm—Stevens, Davis, Miller & Mosher

[57] ABSTRACT

A process and device for fabricating a three-dimensional object from a light curable liquid resin by irradiating a light to a surface of the liquid resin to form successive cross-sectional layers of the cured resin superimposed on each other. An open top enclosure surrounds the entire circumference of the preceding cured layer and a top upper end face of the enclosure is kept at the same horizontal level as that of the preceding cured layer. The liquid resin is supplied over the preceding layer, over the enclosure and into a space defined therebetween in such a manner as to positively overflow a portion of the liquid resin outwardly over the top end of the enclosure, thereby leaving a continuous coat of the liquid resin extending horizontally over from the preceding cured layer and to the enclosure. The continuous liquid resin coat may have a droop only at an outer perimeter of the enclosure such that it can have an equal thickness and flat surface area extending from the top surface of the preceding cured layer to at least the inner periphery of the top face of the enclosure. Thus, an additional cured layer of uniform thickness can be readily formed and superimposed on the preceding layer. The enclosure may be formed by the light irradiation toward the liquid resin so as to self-grow incrementally each time an additional cross-sectional layer is formed.

13 Claims, 10 Drawing Sheets

PROCESS OF AND APPARATUS FOR MAKING THREE DIMENSIONAL OBJECTS

BACKGROUND OF THE INVENTION

1. Field of the Invention

The present invention is directed to a process and a device for fabricating a three-dimensional object from a light curable resin liquid, and more particularly to an improvement in such process and device for fabricating the three-dimensional object with increased accuracy and efficiency.

2. Description of the Prior Art

Such three-dimensional object forming process from a light curable resin has been proposed in the art to be advantageous in fabricating a small quantity of product models or prototypes without relying upon molds or machining tools, as disclosed in Japanese Patent Early Publication [Kokai] Nos. 61-141817, and 63-141724.

A process of Publication No. 61-141817 comprises supplying a light curable liquid resin into a vessel to form on a vessel bottom a liquid resin coat of a desired thickness. A laser beam is then directed from above to move across the resulting liquid resin coat in a predetermined pattern to cure it into a correspondingly shaped cross-sectional layer. Subsequently, a fresh liquid resin is supplied over the preceding cured layer and is likewise irradiated by the laser beam to form another cured cross-sectional layer superimposed on the preceding cured layer. The above steps are repeated to obtain successive cross-sectional layers of cured resin which are superimposed on each other to represent a three-dimensional object of desired configuration. This process, however, poses an inherent problem in that it is difficult to control exactly and rapidly the thickness of the liquid resin coat. That is, with this prior art process, the thickness of the liquid resin coat is determined by the amount of the liquid resin supplied into the vessel, but exact control of the supplying amount requires an extremely difficult measure and therefore is not available and practical at the present. Consequently, the prior art process is very likely to suffer from a thickness variation in the coat of the liquid resin and therefore eventually fails to fabricate an accurate three-dimensional object.

Figure 16:
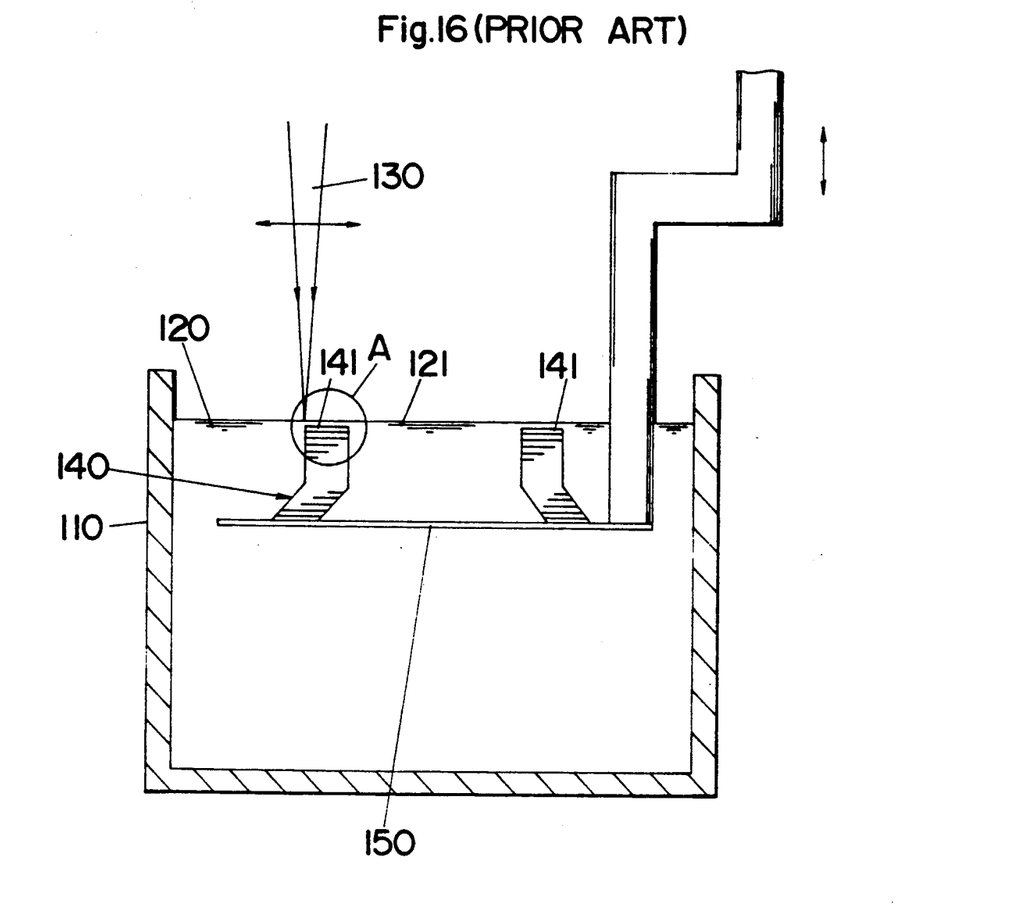
FIG. 16 is a vertical section illustrating a prior art process of fabricating a three-dimensional object.

On the other hand, the process of another prior art, Publication No. 63-141724 is free from the above problem, since it does not require control of the supply amount of the liquid resin at the time of forming a liquid resin coat to be cured into a cross-sectional layer. As schematically shown in FIG. 16, this prior art process utilizes a vessel 110 containing a volume of the liquid resin 120 and a base 150 which is vertically movable within the vessel 110. The base 150 is firstly lowered sufficiently below the liquid level and is then lifted to a position immediately below the liquid level so as to obtain thereon a liquid resin coat 121 of a desired thickness, which is to be formed by irradiation by a laser beam 130 into a cured cross-sectional layer 141 on the base 150. Subsequently, the base 150 is again immersed together with the preceding cured layer 141 in the liquid resin 120 and is then lifted to have the top surface of the preceding cured layer 141 positioned immediately below the liquid level so as to form a fresh liquid resin coat 121 to be formed into another cured cross-sectional layer superimposed on the preceding cured layer 141. The steps are repeated to form successive cross-sectional layers 141 of cured resin on the base 150, thereby fabricating a three-dimensional object 140 of an intended configuration.

This process relies upon a phenomenon that a fresh liquid resin supplied over the preceding cured layer 141 or the base 150 is partially displaced outwardly as the base 150 moves upwardly while leaving the remainder of the liquid resin remain cohered over the preceding cured layer 141, or the base 150 due to its high viscosity, thereby providing the liquid resin coat 121 of which thickness T is determined by surface tension, viscosity and specific gravity of the liquid resin as well as interfacial tension between the liquid resin and the preceding layer 141 or the base 150. Thus, the liquid resin coat 121 can be provided over the preceding cured layer 141 or the base 150 in a desired thickness without the necessity of controlling the supplying amount of the liquid resin 120.

Figure 17:
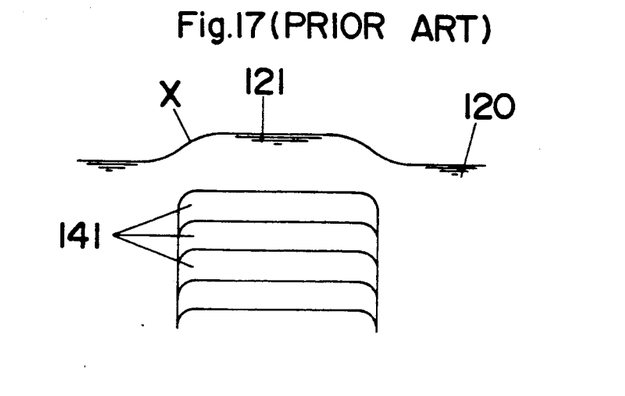
FIG. 17 is an enlarged view of a portion of A indicated in FIG. 16 for illustration of a problem occurring in the prior art process.

With this process, however, there still remains a problem in that, as typically shown in FIG. 17 (which is a portion A of FIG. 16), when the preceding cured layer 141 is lifted just below the liquid level, the liquid resin lying over the preceding cured layer 141 will not be displaced immediately due to its high viscosity, or it is very reluctant to flow smoothly, thereby leaving a shouldered portion X on the liquid resin coat 121 which portion X is characterized to be raised relative to the surrounding liquid level. Such shouldered portion X can disappear only after an elapse of an extended time and therefore remains during the immediately following laser irradiation so that it is cured into corresponding shape which distorts the resulting layer 141 and fails to present a uniform thickness over the entire area of the cured layer 141. The distortion or uneven thickness in each cured layer will accumulate to cause a critical deformation on the successive layers, or the three-dimensional object. Although, the above problem could be avoided by sufficiently elongating the interval between the formation of the successive cross-sectional layers, this is very time-consuming and does not meet the practical demand of efficiently fabricating the three-dimensional object. In short, the above process is not suitable to fabricate the three-dimensional object into an accurate configuration at a high production rate.

SUMMARY OF THE INVENTION

The above problems can be eliminated in the present invention which provides an improved process and device of fabricating a three-dimensional object from a light curable resin. A light is radiated to a surface of the light curable liquid resin to produce successive layers of cured resin having the same or different two-dimensional configurations, which are superimposed on each other to present the three-dimensional object. The improvement of the present invention is to utilize an open top enclosure which surrounds the entire circumference of the preceding cured layer while a top upper end face of the enclosure is kept at the same horizontal level as that of the preceding cured layer. The liquid resin is supplied over the preceding layer and into a space defined between the preceding layer and the enclosure in such a manner as to positively overflow a portion of the liquid resin outwardly over the top end of the enclosure. With this result, it is readily possible to rapidly spread the liquid resin over from the preceding layer and the enclosure to thereby provide a continuous coat of the liquid resin extending horizontally thereover. The top end face of the enclosure has a suitable horizontal dimension such that thus obtained continuous coat can be of uniform thickness over an extended area extending form the preceding cured layer to the inner periphery of the top end face of the enclosure, assuring a uniform thickness liquid resin coat over and around the preceding cured layer. Whereby, an additional layer of uniform thickness is formed by irradiation of the light and superimposed on the preceding layer without requiring a complicated control of the amount of the liquid resin. According to the present invention, therefore, it is readily possible to rapidly obtain a liquid resin coat of uniform thickness over the preceding cured layer. The result is that the cross-sectional layer of controlled thickness can be successively formed without a delay to present a precisely configured three-dimensional object with improved efficiency.

Accordingly, it is a primary object of the present invention to provide a process and device for fabricating a three-dimensional object into a precise configuration in an efficient manner to improve the production rate.

In a preferred embodiment, the liquid resin is stored in a vessel and is supplied over the preceding cured layer through the steps of firstly lowering to immerse the preceding cured layer together with the enclosure into the volume of the liquid resin in the vessel and then lifting them above the liquid level of the vessel to have the continuous coat of the liquid resin extending horizontally over from the preceding cured layer to the enclosure. Alternately, the liquid resin may be sprayed from the above over the preceding cured layer, the enclosure and into a space defined therebetween to have the continuous coat of the liquid resin extending horizontally over the preceding cured layer and the enclosure. In either case, the continuous coat of the liquid resin can be smoothed to have a uniform thickness determined by the combination of surface tension, viscosity and specific gravity of the liquid resin as well as interfacial tension between the liquid resin and the preceding layer.

The enclosure may be formed by the like light irradiation commonly from the liquid resin as a self-growing one of which height is increased incrementally each time an additional layer is formed. With this scheme, it is readily possible to maintain the height of the enclosure at the same horizontal level as that of the preceding cured layer without requiring any additional part or complicated mechanism for adjusting the horizontal level of the enclosure. In addition, the self-growing enclosure can be formed in any desired position around the preceding cured layer so that it is spaced therefrom at an optimum distance which may vary from one cross-sectional layer to the adjacent cross-sectional layer.

It is therefore another object of the present invention to provide a process and device for fabricating a three-dimensional object in which the enclosure can be made commonly from the liquid resin without the use of any other enclosure-forming material to facilitate accurate and efficient fabrication of a three-dimensional object.

Preferably, the self-growing enclosure can be spaced at a constant distance from the preceding cured layer over substantially the entire steps of forming additional layers on the preceding cured layer, i.e., over the full height of the three-dimensional object. In other words, the self-growing enclosure can be made into a configuration which is analogous to the preceding cured layer so as to always keep the enclosure spaced horizontally from the preceding cured layer by a constant distance during each time of successively forming the cross-sectional cured layers, contributing to assure a uniform thickness to the continuous coat of the liquid resin extending from the preceding cured layer to the enclosure, which is therefore a further object of the present invention.

When a three-dimensional object with an outward projecting portion is intended, it is advantageous to make the use of the self-growing enclosure in such a manner as to connect such projecting portion integrally and horizontally to the enclosure by way of a bridge segment or segments. The bridge segment acts to hold the projecting portion in place around the successively formed cross-sectional layers against a possible declination of that portion during the fabrication of the three-dimensional object. After forming the successive cross-sectional layers, the bridge segment can be removed.

It is therefore a further object of the present invention to provide a process of fabricating a three-dimensional object in which a self-growing enclosure can be best utilized to support an outward projecting portion on the three-dimensional object for protection of that projecting portion against possible declination or collapsing during the steps of successively forming the cross-sectional cured layers. In a further embodiment of the present invention, an open top enclosure of predetermined structure is utilized to surround the successively formed cured layers in a horizontally spaced relation thereto. Disposed within the enclosure is a base which supports thereon the cured cross-sectional layer or layers and which defines thereon and within the confines the enclosure a reservoir into which the liquid resin is supplied from above. The base is controlled to move vertically within the enclosure in such a manner as to position the top end surface of the preceding cured layer at substantially the same horizontal level with a top end face of the enclosure. Whereby the liquid resin supplied over the preceding cured layer and into the reservoir is caused to have its portion overflowing outwardly over the enclosure so as to leave a continuous coat of the liquid resin extending horizontally from the top surface of the preceding cured layer to the top end face of the enclosure. With this result, the continuous coat is made to have a uniform thickness over an area extending from the preceding cured layer to an inner periphery of the top end face of the enclosure. In this manner, a liquid resin coat of uniform thickness can be formed within the confines of the enclosure by moving the base relative to the enclosure while positively overflowing an extra amount of the liquid resin outwardly of the enclosure. Therefore, it is also possible to obtain a liquid resin coat of uniform thickness without requiring to control the supplying amount of the liquid resin, which is therefore a still further object of the present invention.

These and still other advantageous features and objects of the present invention will become more apparent from the following detailed description of the preferred embodiments of the invention when taken in conjunction with the attached drawings.

DETAILED DESCRIPTION OF THE PREFERRED EMBODIMENTS

First Embodiment

Figure 1:
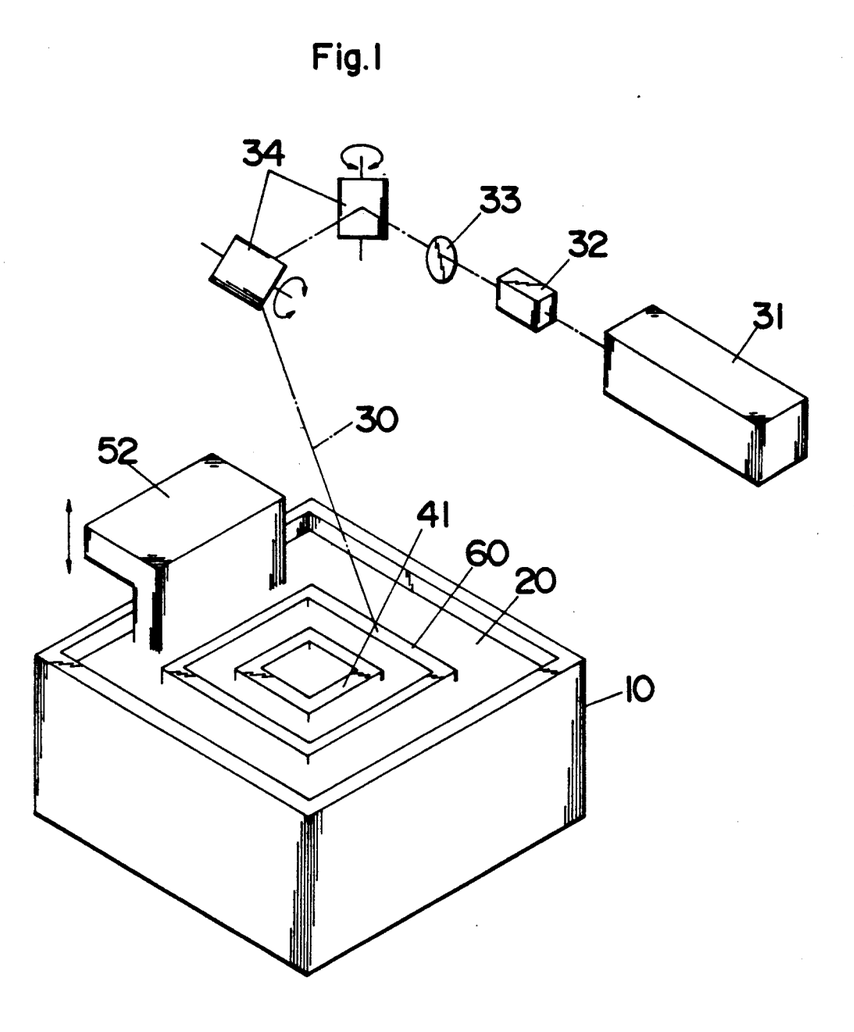
FIG. 1 is a schematic view illustrating a device for fabricating a three-dimensional object from a light curable liquid resin.
Figure 2:
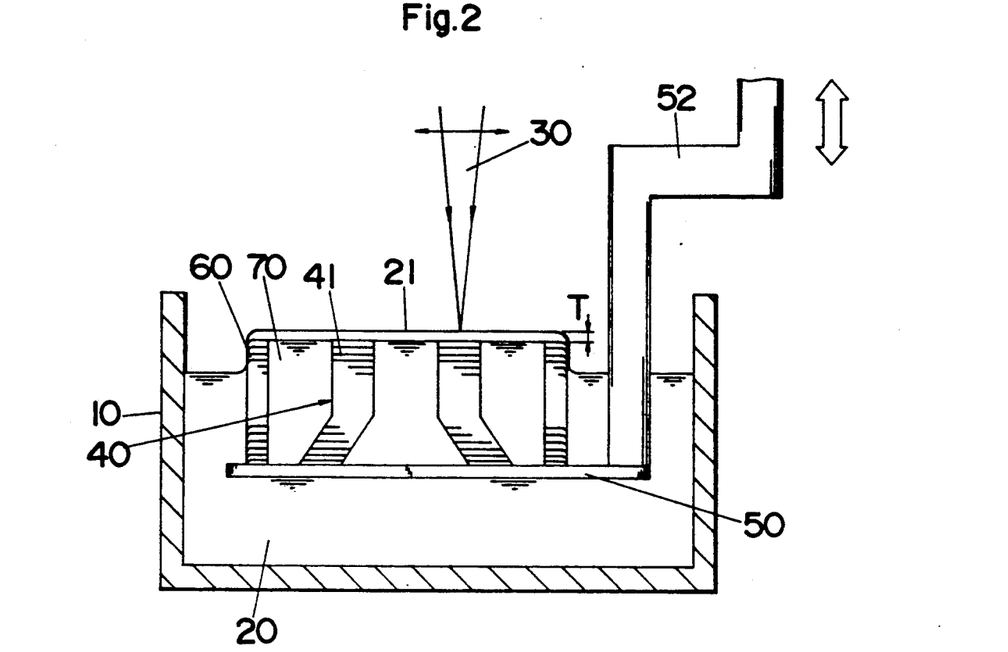
FIG. 2 is a vertical section of a portion of the device in which successively formed cross-sectional layers constituting a three-dimensional object and a self-growing enclosure are formed together on a base from the liquid resin supplied into a vessel in accordance with a first embodiment of the present invention.
Figure 3:
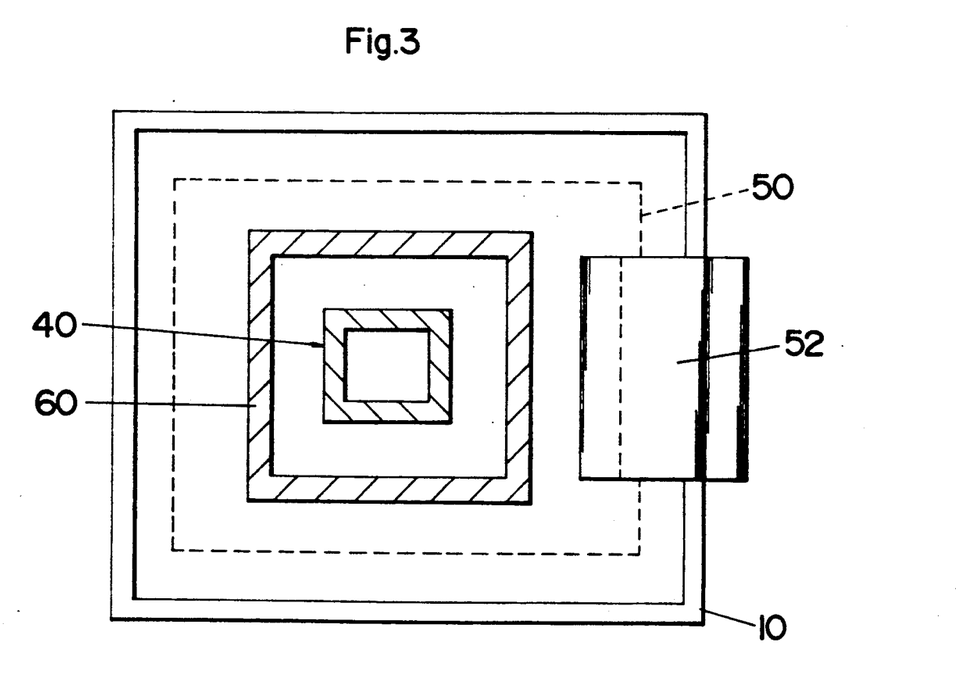
FIG. 3 is a top view of a portion of the device of FIG. 2.

Referring first to FIGS. 1 and 2, there is shown an improved process of fabricating a three-dimensional object in accordance with a first embodiment of the present invention. The process utilizes a device including a vessel 10 filled with a light curable resin 20, a light beam 30 which is directed to the surface of the liquid resin 20 to form thereat a cured layer 41, and a base plate 50 connected to an elevator arm 52 to be vertically movable within the vessel 10. The liquid resin includes an ultraviolet light curable resin such as denatured polyurethanemethacrylate, oligoesteracrylate, urethaneacrylate, epoxyacrylate, photosensitive polyimide, aminoalkyd, or the like generally utilized in the art for the fabrication of proto-types or product models. The light beam 30, for example, He-Cd laser beam is directed from a light source 31 through a shutter 32, a convergent lens 33, and scan mirrors 34 to the surface of the liquid resin 20 so that it can move in X-Y directions to draw any desired two-dimensional pattern or configuration for solidification of the liquid resin into such pattern or configuration.

Figure 4:
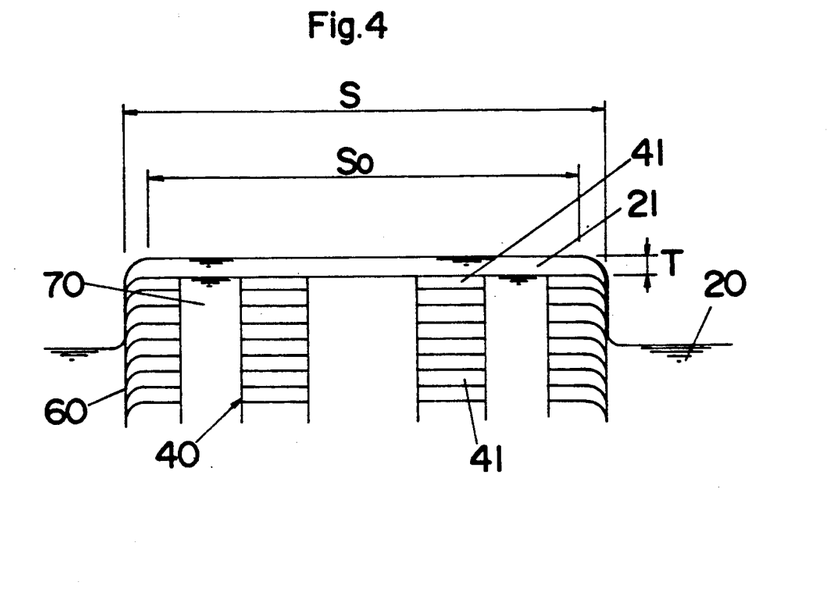
FIG. 4 is a somewhat enlarged view of the successively formed cross-sectional layers and the self-growing enclosure with a continuous coat of liquid resin formed thereover.

Initially, the base plate 50 is immersed in the volume of the liquid resin 20 in the vessel 10 and is then lifted to a position above the liquid level in such a way as to positively overflow a portion of the liquid resin 20 outwardly of the base plate 50. Whereby the remaining liquid resin is kept held on the base plate 50 for a relatively long time due to its viscosity and interaction with the base plate 50 so as to form a liquid resin coat which is rounded or droops only at a peripheral edge of the base plate 50 and is therefore of substantially uniform thickness over the base plate 50 except at that edge. Such thickness is determined by surface tension, viscosity and specific gravity of the liquid resin as well as interfacial tension between the liquid resin 20 and the base plate 50. The overflowed liquid resin 20 is recovered into the vessel 10. Subsequently, the liquid resin coat held stuck on the base plate 50 is exposed to the light beam 30 to be cured into a first cross-sectional layer 41 of desired configuration on the center portion of the base plate 50. At the same time, the light beam 30 is directed to a portion of the liquid resin coat outside of the cross-sectional layer 41 to form thereat a self-growing enclosure 60 surrounding the cross-sectional layer 41. The enclosure 60 is formed on the base plate 50 inside of the peripheral edge thereof to have an equal thickness or height as that to the cross-sectional layer 41 and to have enough width or wall thickness. Thus formed enclosure 60 is cooperative with the cured layer 41 to define therebetween a space in which uncured liquid resin 20 remains. Thereafter, the base plate o is again immersed in the volume of the liquid resin together with the cured layer 41 and the enclosure 60 and is then lifted above the liquid level of the vessel 10 so as to overflow a portion of the liquid resin outwardly over the enclosure 60 into the vessel 10 and leave a continuous coat of the liquid resin extending horizontally over from the top surface of the cured layer 41 to the top end face of the enclosure 60. At this condition, the light beam 30 is likewise directed to a selected portion of the liquid resin coat 21 to form a next cured layer 41 superimposed on the preceding cured layer 41 as well as a next cured layer on the enclosure 60. The above steps are repeated to form successively cured cross-sectional layers 41 constituting a three-dimensional object 40 and the self-growing enclosure 60, as shown in FIGS. 2 and 4. It is noted at this time that the enclosure 60 is configured to have enough width or wall thickness such that the continuous liquid resin coat 21 may have a droop only at its outer peripheral edge, as best shown in FIG. 4, and therefore can keep its flat surface level on the inner top end portion of the enclosure 60 at the same horizontal level as that on the preceding cured layer 41, assuring to give a uniform thickness T at least within an area $S_0$ extending from the top surface of the preceding cured layer 41 to the inner top end face of the enclosure 60, while the continuous coat 21 is formed over an entire area S including the outer top periphery of the enclosure 60. In other words, the flat area $S_0$ of uniform thickness T can be always formed to extend over the inner top end of the enclosure 60, which ensures to increment the thickness or height of the enclosure 60 by the same thickness as the cross-sectional layer 41 being formed, thereby always keeping the top end face of the self-growing enclosure 60 at an equal horizontal level as that of the preceding cured layer 41. That is, the self-growing enclosure 60 has its entire top periphery kept at the same horizontal level substantially equal to the top surface of the preceding cured cross-sectional layer 41. Since the uniform thickness area $S_0$ is obtained to extend over the inner top end face of the enclosure 60 at each time of forming an additional cross-sectional layer 41 on the preceding cured layer 41, the resulting cured layer 41, which may be of larger cross-sectional area than the preceding layer 41, can be always transformed into a uniform thickness, contributing to fabricate an accurately outlined three-dimensional object. In the illustrated embodiment, the self-growing enclosure 60 is formed to therein define a horizontal area equal over the full height of the enclosure 60, however, it is equally possible to develop the enclosure 60 in a direction of approaching the successively cured cross-sectional layers 41 as they are formed in order to successfully obtain the uniform thickness and flat area $S_0$ extending over the inner top end face of the self-growing enclosure 60. It is noted at this time that the successive layers 41 of cured resin will be integrated into one piece of the object 40 owing to the natural adhesive properties of the liquid resin.

Figure 5:
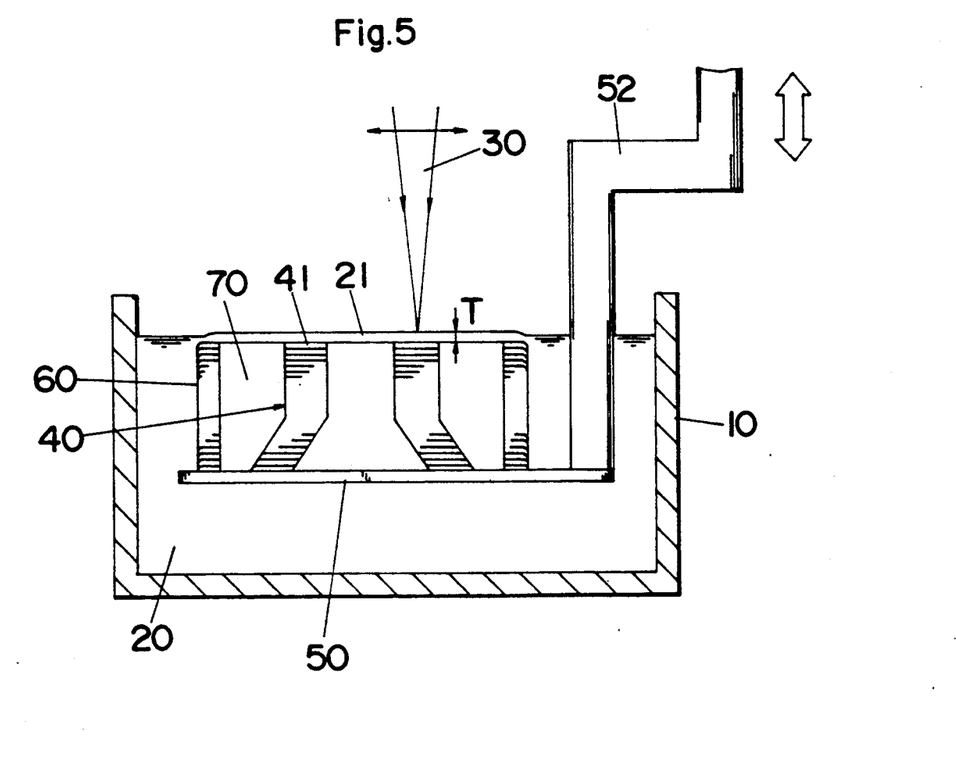
FIG. 5 is similar to FIG. 2 but shows a different vertical position at which a continuous coat of liquid resin is obtained over the preceding cured cross-sectional layer and the self-growing enclosure.

The liquid resin 20 may be alternately supplied by positioning the top surface of the preceding layer 41 and the enclosure 60 immediately below the liquid level in the vessel 10, as shown in FIG. 5, so as to form a continuous liquid resin coat 21 of a thickness T slightly projecting above the liquid level. In either case, because of that the uncured liquid resin 20 is kept stored in a space 70 between the stack of the successive cross-sectional layers 41 and the enclosure 60 in such a manner as to wrap the stack and also because of that there is no relative movement between the liquid resin in the space 70 and the stack of the layers 41 during the vertical movement of the base plate 50, the liquid resin filled in the space 70 acts to buffer the flow-in of the liquid resin 20 when the base plate 50 is lowered to introduce a fresh amount of the liquid resin 20 from within the vessel 10 over the preceding cured layer 41, the enclosure 60 and into the space 70, thereby protecting the stack of the cured cross-sectional layers 41 to be substantially free from a rushing liquid resin flow which might otherwise act to deform the already cured cross-sectional layers 41.

Figure 6:
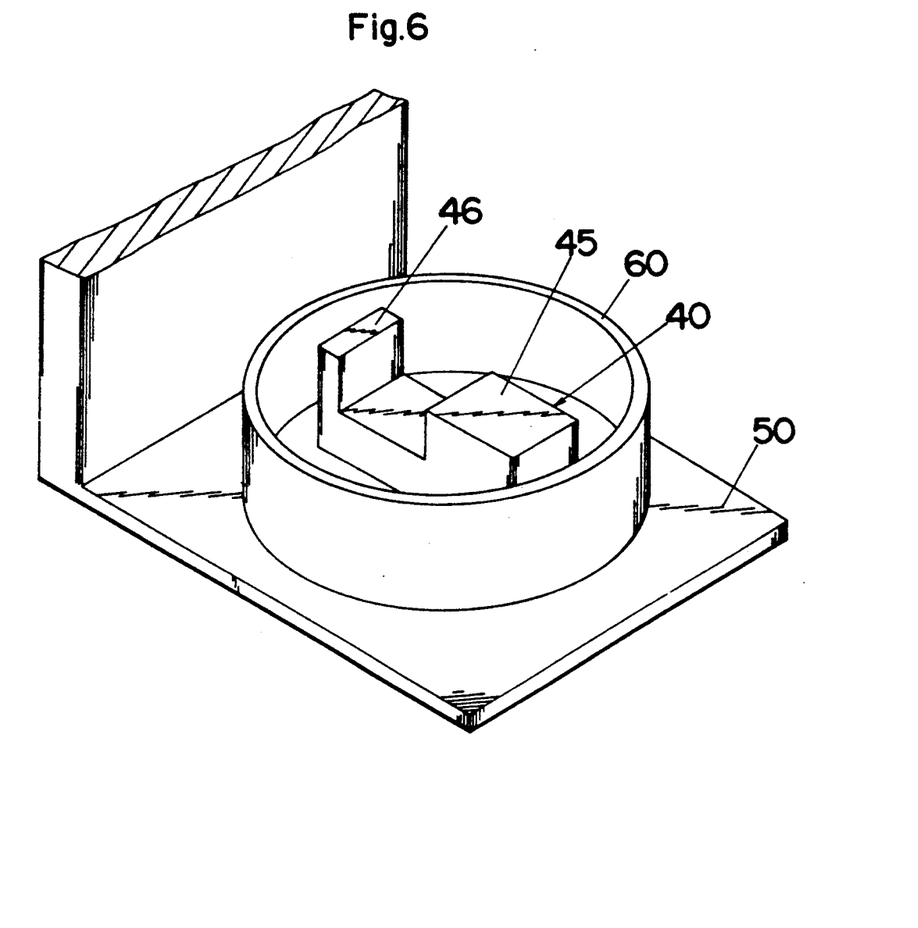
FIG. 6 is a perspective view illustrating the fabrication of a three-dimensional object having laterally spaced sections of different cross-sectional areas.
Figure 7:
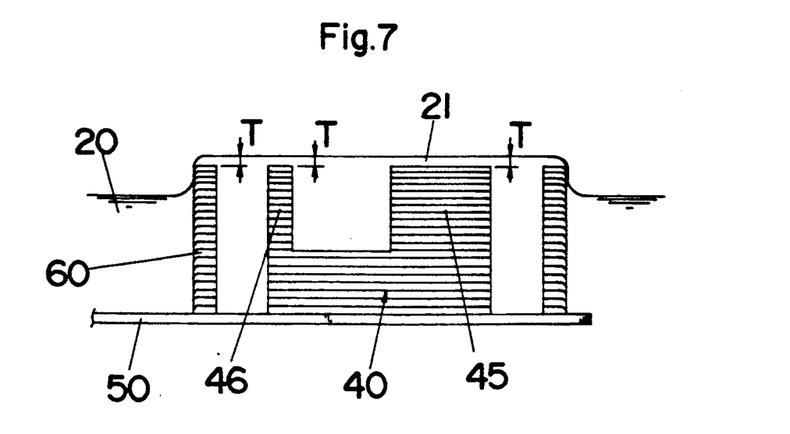
FIG. 7 is a vertical section of the three-dimensional object of FIG. 6 and the self-growing enclosure being formed.
Figure 8:
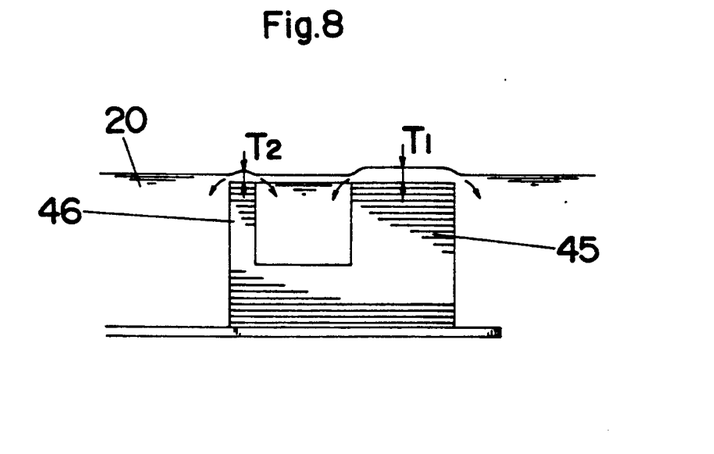
FIG. 8 is a vertical section illustrating a problem which is expected in the fabrication of the three-dimensional object of FIG. 6 by a prior art process.

As shown in FIGS. 6 and 7, a three-dimensional object 40 with horizontally spaced sections 45 and 46 of different surface areas can be successfully fabricated in accordance with the above process of utilizing the enclosure 60. When such object is fabricated in a prior process without the enclosure, as shown in FIG. 8, there arises a problem that the liquid resin coat is of greater thickness $T_1$ on the section 45 of greater surface area than the thickness $T_2$ on the other section 46 of less surface area, in addition to that the liquid resin coat droops at the edge of the sections 45 and 46. Such thickness difference is thought to result from an edge effect that the liquid resin adjacent the edge of the sections 45 and 46 are more likely to flow out. Therefore, the liquid resin on the section 46 of less surface area will see more edge effect than the section 45 of greater surface area such that the volume of the liquid resin on the section 46 is decreased by a greater extent than the liquid resin on the section 45, thereby lowering the thickness $T_2$ on the section 46 relative to the thickness $T_1$ on the section 46. In contrast, the above problem can be eliminated in the present invention where such edge effect occurs only at the outer peripheral edge of the enclosure 60 and not at the sections 45 and 46 within the confines of the enclosure 60. That is, by positively overflowing an extra amount of the liquid resin 20 outwardly across the top of the enclosure 60, a continuous coat 21 of the liquid resin can extend horizontally from the sections 45 and 46 to the enclosure 60 without leaving any substantial surface irregularity within the confines of the enclosure 60, as shown in FIG. 7, thereby assuring to provide on the sections 45 and 46 respectively cured layers 41 of uniform thickness T.

Figure 9:
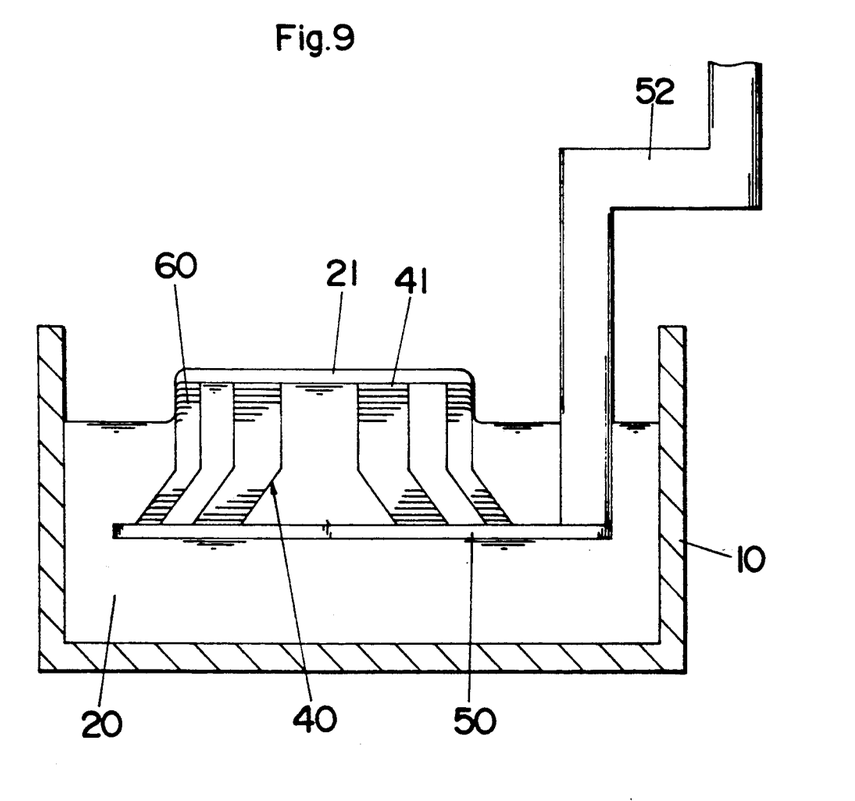
FIG. 9 is a vertical section illustrating a modification of the process of FIG. 2 for fabrication of a three-dimensional object.

As shown in FIG. 9, the self-growing enclosure 60 may be formed in an analogous fashion around the successively formed cross-sectional layers 41 by spacing the enclosure 60 horizontally from the outer periphery of the cross-sectional layers 41 by an equal distance as they are formed.

Second Embodiment

Figure 10:
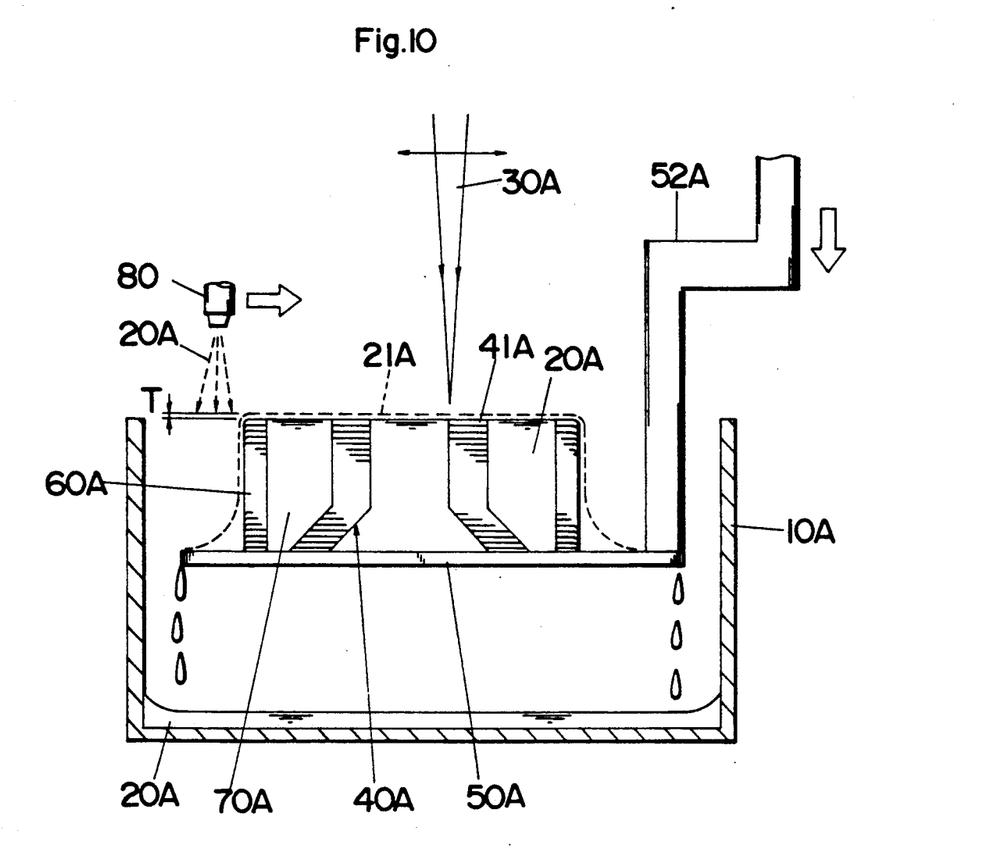
FIG. 10 is a vertical section of a portion of the device in which successively formed cross-sectional layers constituting a three-dimensional object and a self-growing enclosure are formed together on a base from the liquid resin sprayed from above in accordance with a second embodiment of the present invention.

Referring to FIG. 10, a second embodiment of the present invention is shown to use a supply head so for supplying a liquid resin 20A over the preceding cured cross-sectional layer 41A and the self-growing enclosure 60A. The other configurations are identical to those of the above embodiment, therefore like parts are designated by like numerals with a suffix letter of "A". The head 80 is movable horizontally to spray the liquid resin 20A over a base plate 50A in a first step of forming a first cured cross-sectional layer 41A and a first increment of the enclosure 60A by irradiation of the light beam 30A, and to spray the liquid resin 20A in subsequent steps of forming additional cured cross-sectional layers 41A and increments respectively on the preceding cured layer 41A and the enclosure 60A. The liquid resin 20A may be sprayed over an area extending outwardly beyond the base plate 50A or the enclosure 60A to expedite the overflowing of the liquid resin over the edge of the base plate 50A or the enclosure 60A, thereby facilitating to obtain a continuous liquid resin coat 21A of uniform thickness T extending over substantially entire portion of the base plate 50A or over from the preceding layer 41A to at least inner top end of the enclosure 60A. The overflowed liquid resin is collected in a vessel 10A. At the time of successively curing the liquid resin, the base plate 50A is controlled to move vertically by an elevator arm 52A in order to locate the liquid resin coat 21A at a fixed vertical position with respect to a focusing point of the light beam 30A. Thus, the irradiation of the light beam 30A to the liquid resin coat 21A can be made in a simple manner without requiring to vary the vertical position of a light beam directing system.

In this embodiment, since the head so is utilized to spray the liquid resin, it is possible to rapidly spread the liquid resin over the intended area and therefore obtain a continuous liquid resin coat 21A in a short time even though the liquid resin is of relatively high viscosity, which enhances the efficiency of forming the cured cross-sectional layers 41A and the enclosure 60A. Further, spraying the liquid resin is advantageous to avoid or reduce unintended flow impact or pressure to the existing cross-sectional layers being cured, protecting the layers from being deformed. Such flow impact or pressure might occur when the liquid resin rushes over the existing layers as a consequence of, for example, rapidly lowering to immerse the layers in the volume of the liquid resin in the device of the first embodiment. The head 80 may be replaced by a plurality of suitable spaced shower nozzles or even by a flow coater which can supply the liquid resin gently over an extended area.

Figure 11:
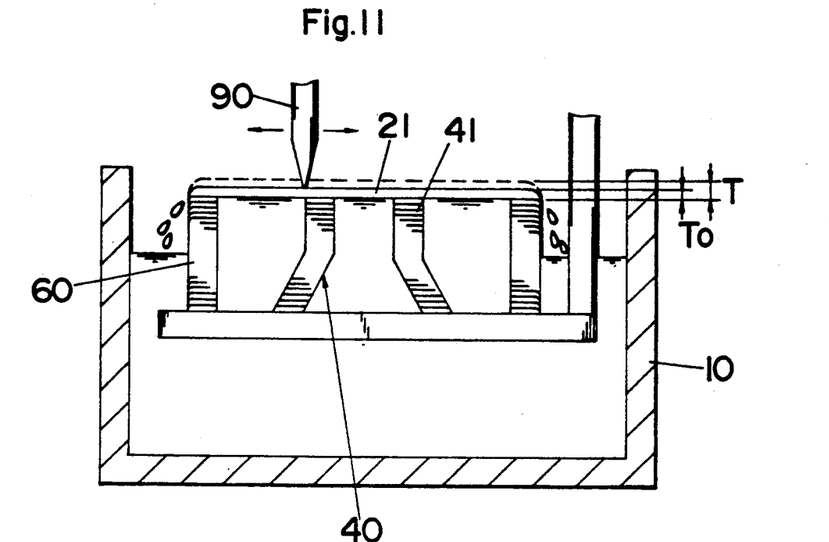
FIG. 11 is a vertical section illustrating a modified process of fabricating a three dimensional object.

As shown in FIG. 11, a doctor knife 90 may be utilized in the device of the first or second embodiment to scrape off an upper surface of the liquid resin coat 21, of which thickness T is determined by surface tension, viscosity and specific gravity of the liquid resin as well as interfacial tension between the liquid resin and the preceding layer 41, in order to quickly obtain a reduced thickness $T_0$.

Figure 12:
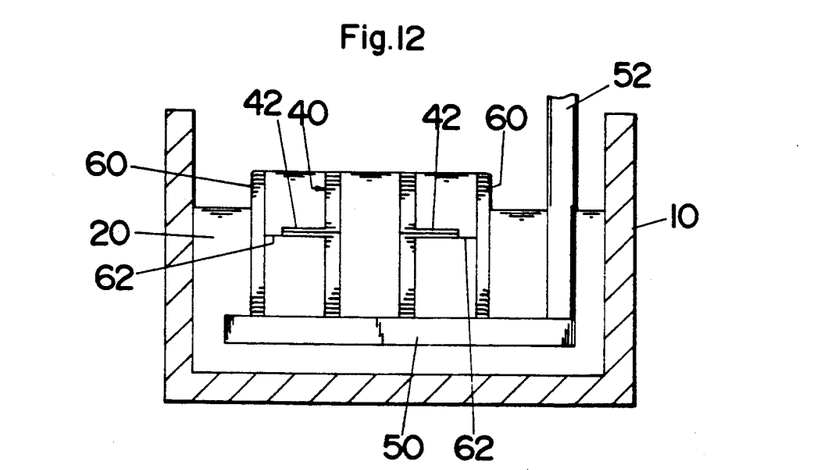
FIG. 12 is a vertical section illustrating another modified process of fabricating a three-dimensional object with an outward projecting portion supported by bridge segments integrally connected to the self-growing enclosure.
Figure 13:
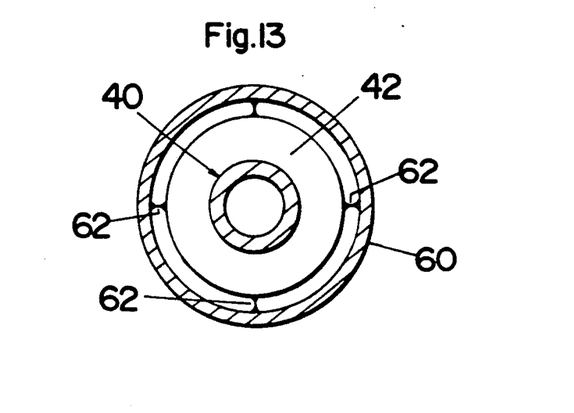
FIG. 13 is a horizontal section of the three-dimensional object of FIG. 12.
Figure 14A:
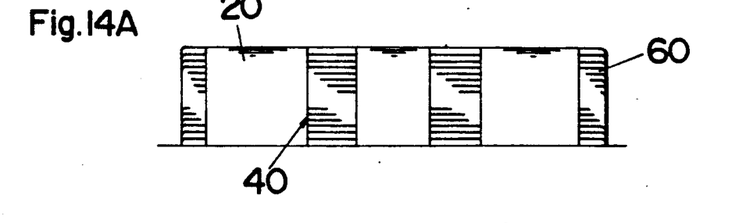
FIGS. 14A to 14E are vertical sections of the successively formed cross-sectional layers constituting the threedimensional object of FIG. 12.
Figure 14B:
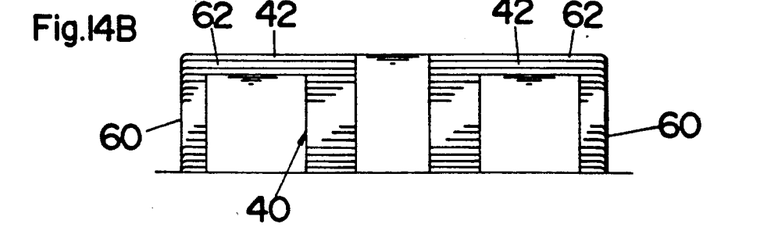
Figure 14C:
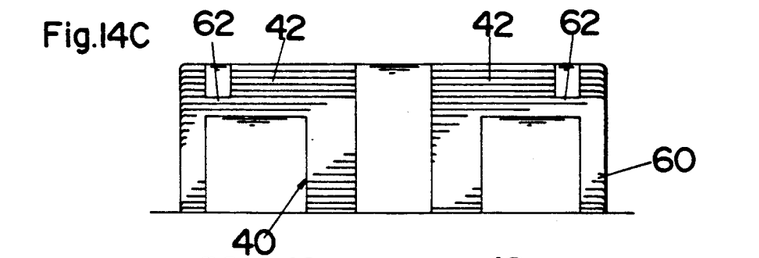
Figure 14D:
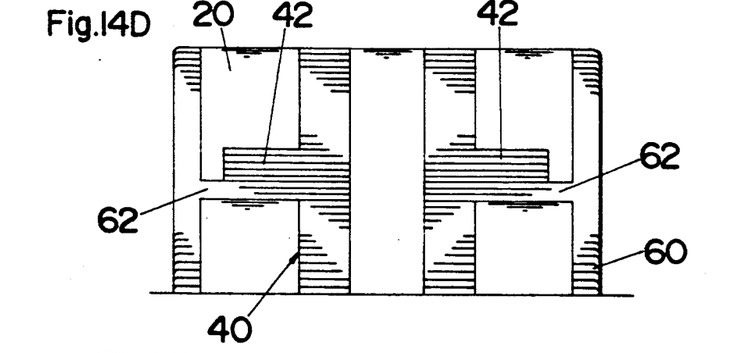
Figure 14E:
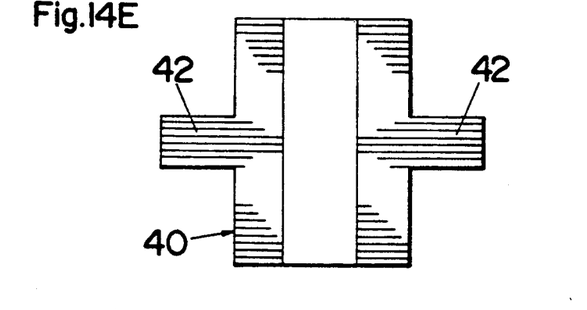

According to the above process disclosed in the first and second embodiment of the present invention, the self-growing enclosure 60 can be best utilized to support an outwardly projecting portion or portions intended to be formed on a three-dimensional object in order to prevent deformation or fracture of such projection or projections during the steps of building up the cross-sectional layers. For example, as shown in FIGS. 12 and 13, when it is intended to fabricate a three-dimensional object 40 with an outward projection 42, bridge segments 62 are formed from the liquid resin coat at the same time of curing the same into the projection 42 and the enclosure 60 so as to integrally connect the projection 42 to the enclosure 60. The bridge segments 62 may be formed around the object 40 in suitably spaced relation with each other, as shown in FIG. 13, to effectively support the projection 42, and also may be made from one or more liquid resin coats to stably support the projection 42 but are made relatively thin enough to be readily detached from the projection 42 after completing the fabrication of the three-dimensional object 40. FIGS. 14A to 14 illustrate typical steps of fabricating a three-dimensional object 40 with such outward projection 42. After the cross-sectional layers 41 are formed and superimposed up to a height just below a position where the projection 42 is expected to begin (FIG. 14A), a lower portion of the intended projection 42, bridge segments 62, and the corresponding portion of the enclosure 60 are formed simultaneously from one or more of the liquid resin coats so as to integrally connect the object 40 and the enclosure 60 being formed (FIG. 14B). Subsequently, an upper portion of the projection 42 is formed by repeating to cure a plurality of the liquid resin coats to complete the projection 42 (FIG. 14C). After a remainder or upper portion of the object 40 is formed to present a full configuration (FIG. 14D), the object 40 is detached from the enclosure 60 at the bridge segments 62 (FIG. 14E) to complete the fabrication. The self-growing enclosure 60 utilized in the above first and second embodiments is disposed of after the fabrication of the object.

Third Embodiment

Figure 15:
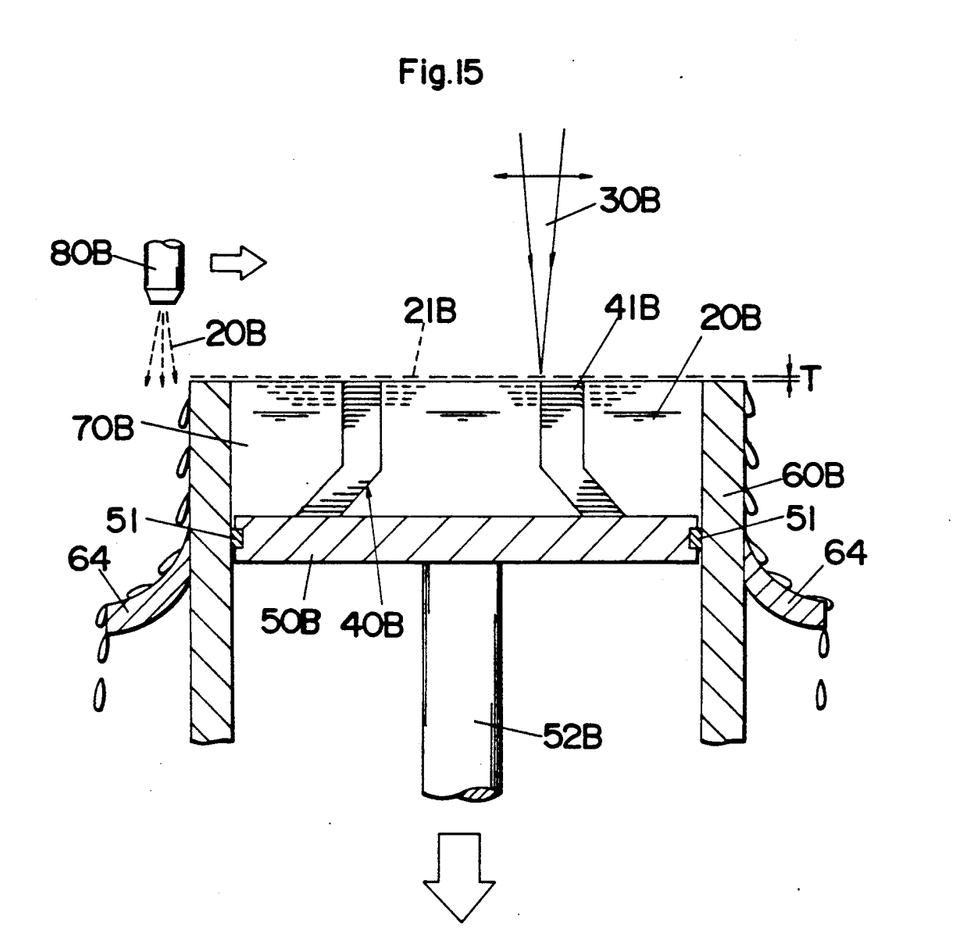
FIG. 15 is a vertical section of a device for fabricating a three-dimensional object in which cross-sectional layers are successively formed on a base which is movable within a fixed enclosure in accordance with a third embodiment of the present invention.

Referring to FIG. 15, a third embodiment of the present invention comprises an open top fixed enclosure 60B of which bottom is defined by a base plate 50B, a spray head 80B disposed above the enclosure 60B to supply the liquid resin 20B, and a plunger 52B connected to the base plate 50B to move it vertically within the enclosure 60B. A slider seal 51 is provided around the base plate 50B to seal the bottom of the enclosure 60B while allowing the base plate 50B to move vertically. Initially, the base plate 50B is lifted to an uppermost position where the top surface of the base plate 50B is at the same horizontal level with the top end of the enclosure 60B. Then, the spray head 80B moves horizontally to spray the liquid resin over the entire surface of the base plate 50B and the enclosure 60B in such a manner as to positively overflow a portion of the liquid resin 20B outwardly across the enclosure 60B and obtain a continuous coat 21B of the liquid resin extending horizontally from the base plate 50B to the enclosure 60B. As discussed with reference to the previous embodiments, the obtained coat 21B of the liquid resin is kept at a uniform thickness T for a relatively long time over an area extending from the base plate 50B to the inner top end face of the enclosure 60B. At this condition, the light beam 30B is directed to a selected portion of the coat 21B to solidify it into a cross-sectional layer 41B of desired pattern. Subsequently, the base plate 50B is stepped down to have the top surface of the preceding cured cross-sectional layer 41B at the same horizontal level as that of the enclosure 60B. At this condition, the liquid resin is sprayed from the head 80B over the preceding cured layer 41B, the enclosure 60B, and into a reservoir or space 70B defined therebetween to fill the reservoir 70B with the liquid resin 20B and at the same time to overflow the liquid resin 20B across the top end of the enclosure 60B, thereby obtaining a continuous liquid resin coat 21B of uniform thickness T extending over from the preceding layer 41B to the enclosure 60B. Then, the light beam 30B is again scanned across the thus obtained coat 21B to solidify it into another cross-sectional layer 41B of a desired configuration which is superimposed on the preceding layer 41B for integration therewith. The above steps are repeated to form successive cross-sectional layers 41B constituting a three-dimensional object 40B. During the fabrication of the object 40B, overflowed liquid resin is guided down along a skirt 64 around the enclosure 60B for recovery, while uncured liquid resin 20B is retained within the enclosure 60B, or the reservoir 70B to keep its liquid level equal to the top end of the enclosure 60B and the preceding layer 41B, enabling to provide the continuous liquid resin coat 21B horizontally extending over from the preceding layer 41B to the enclosure 60B. The enclosure 60B is designed to have enough wall thickness such that the continuous liquid resin coat 21B may have a droop only at its outer perimeter and therefore can exhibit a flat surface coat of uniform thickness T at least within the confines of the enclosure 60B for accurate formation of each one of the successively cured layers into a uniform thickness. When it is desired to reduce the thickness of the liquid resin coat, a doctor knife or the like may be utilized as discussed with reference to FIG. 11.

It should be noted that the features of the above embodiments and modifications can be suitably combined in any manner so as to further improve the fabrication process and device.

What is claimed is:

1. In a process of fabricating a three-dimensional object from a light curable liquid resin of viscous nature by radiating a light to a top surface of said light curable liquid resin to form cure successive cross-sectional layers of the resin and superimposing said layers on each other, an improvement comprising:
   surrounding an entire circumference of a preceding cured cross-sectional layer by means of an open top enclosure in a horizontally spaced relation thereto;

positioning a top end face of said enclosure at a horizontal level which is substantially the same as a top surface of the preceding cured cross-sectional layer each time an additional layer is to be formed on said preceding cured layer;

supplying said liquid resin across said preceding cured cross-sectional layer, said enclosure and into a space defined therebetween, and causing a portion of said liquid resin to overflow over an entire circumference of the top end face of said enclosure to thereby leave a continuous coat of said liquid resin extending horizontally from the top surface of said preceding cured layer to said top end face of said enclosure such that said continuous coat of said liquid resin is of a uniform thickness over an area extending from the top of said preceding cured layer to at least an inner periphery of said top end face of said enclosure; and irradiating said light to a selected portion of said continuous coat of the liquid resin to form thereat said additional cured layer of a desired two-dimensional configuration to be superimposed on said preceding cure layer.

2. A process as set forth in claim 1, wherein said liquid resin is stored in a vessel and is supplied over said preceding cured layer through the steps of firstly lowering to immerse said preceding cured cross-sectional layer together with said enclosure into a volume of a liquid resin in said vessel and then lifting them to a level above or immediately below the liquid level of said vessel so as to overflow a portion of said liquid resin across said enclosure, thereby obtaining said continuous coat of the liquid resin extending horizontally over from said preceding cured layer to said enclosure.

3. A process as set forth in claim 1, wherein said liquid resin is sprayed from above across said preceding cured layer, said enclosure and into a space defined therebetween to have said continuous coat of the liquid resin extending horizontally continuously from said preceding cured layer to said enclosure.

4. A process as set forth in claim 1, wherein said enclosure is formed commonly from said liquid resin by irradiation of said light substantially simultaneously with forming each successive cured cross-sectional layer so as to have a height thereof increased by an increment of thickness which is substantially the same as that of the cured cross-sectional layer.

5. A process as set forth in claim 4, wherein said enclosure is integrally and horizontally connected to an outwardly projecting portion to be formed on said three-dimensional object by way of a bridge segment or segments, said bridge segment being formed commonly from said continuous coat of the liquid resin by irradiation of said light substantially simultaneously with forming of one or more of the cured cross-sectional layers including said outwardly projecting portion.

6. A process as set forth in claim 1, wherein said enclosure is formed to define therein a horizontal area which is substantially the same over substantially a full height of said enclosure.

7. A process as set forth in claim 1, wherein said enclosure is horizontally spaced for the corresponding cured cross-sectional layers by a distance which is substantially the same over substantially a full height thereof.

8. A device for fabricating a three-dimensional object from a light curable liquid resin of viscous nature by radiating a light to a top surface of said light curable liquid resin to form cure successive cross-sectional layers of the resin and superimposing said layers on each other, said device comprising:

a vessel for containing a volume of said liquid resin;

an open top self-growing enclosure surrounding an entire circumference of a preceding cured cross-sectional layer in a horizontally spaced relation thereto, said enclosure being formed commonly from said liquid resin substantially simultaneously with forming of each said preceding cross-sectional cured layer to have its height increased by an increment of thickness which is substantially the same as that of said preceding cured layer such that a top end face of said enclosure is maintained at a horizontal level which is substantially the same as a horizontal level of top surface of the preceding cured cross-sectional layer;

a base supporting thereon said preceding cured cross-sectional cured layer or layers together with said self-growing enclosure;

elevator means connected to said base to lower said preceding cured layer or layers together with said enclosure into resin liquid within said vessel and to lift them up in order to supply said liquid resin over across said preceding cured layer, said enclosure and into a space defined therebetween, and to cause a portion of said liquid resin to overflow over said enclosure tot hereby leave a continuous coat of said liquid resin extending horizontally form a top surface of said preceding cured layer to said top end face of said enclosure such that said continuous coat is of a uniform thickness over an area extending from a top surface of said preceding cured layer to an inner periphery of said top end face of said enclosure; and a light source directing said light to a selected portion of said continuous coat of the liquid resin to form an additional cured layer of a desired two-dimensional configuration to be superimposed on said preceding cure layer as well as to form an additional cured layer to be superimposed on said self-growing enclosure.

9. A device for fabricating a three-dimensional object from a light curable liquid resin of high viscosity by radiating a light to a top surface of said light curable liquid resin to form cure successive cross-sectional layers of the resin and superimposing said layers on each other, said device comprising:

an open top self-growing enclosure surrounding the an entire circumference of a preceding cured cross-sectional layer in a horizontally spaced relation thereto, said enclosure being formed commonly from said liquid resin substantially simultaneously with the forming of each said preceding cross-sectional cured layer to have a height thereof increased by an increment of thickness which is substantially the same as that of said preceding cured layer such that a top end face of said enclosure is maintained at a horizontal level which is substantially the same as a horizontal level of a top surface of the preceding cured cross-sectional layer;

a base supporting thereon said previously cured cross-sectional cured layer or layers together with said self-growing enclosure;

elevator means connected to said base to lift and lower said preceding cured layer to layers together with said enclosure;

supply means supplying said liquid resin across said preceding cured layer, said enclosure and into a space defined therebetween, and causing a portion of said liquid resin to overflow over the top end face of said enclosure to thereby leave a continuous coat of said liquid resin extending horizontally form a top surface of said preceding cured layer to said top end face of said enclosure such that said continuous coat is of a uniform thickness over an area extending from the top of said preceding cured layer to at least an inner periphery of said top end face of said enclosure; and a light source directing said light to a selected portion of said continuous coat of the liquid resin to form an additional cured layer of a desired two-dimensional configuration to be superimposed on said preceding cured layer as well as to form an additional cured layer to be superimposed on said self-growing enclosure.

10. A device as set forth in claim 8, wherein said enclosure is formed to define therein a horizontal area which is substantially the same as a horizontal area over substantially a full height of said enclosure.

11. In a process of fabricating a three-dimensional object from a light curable liquid resin of viscous nature by radiating a light to a top surface of said light curable liquid resin to form cure successive cross-sectional layers of the resin and superimposing said layers on each other, an improvement comprising:

surrounding an entire circumference of a preceding cured cross-sectional layer by means of an open top enclosure in a horizontally spaced relation thereto;

positioning top end face of said enclosure at a horizontal level which is substantially the same as a top surface of the preceding cured cross-sectional layer each time an additional layer is to be formed on said preceding cured layer;

supplying said liquid resin across said preceding cured cross-sectional layer, said enclosure and into a space defined therebetween, and causing a portion of said liquid resin to overflow over an entire circumference of the top end face of said enclosure to thereby leave a continuous coat of said liquid resin extending horizontally form the top surface of said preceding cured layer to said top end face of said enclosure such that said continuous coat of said liquid resin is of a uniform thickness over an area extending form the top of said preceding cured layer to at least an inner periphery of said top end face of said enclosure; and irradiating said light to a selected portion of said continuous coat of the liquid resin to form thereat said additional cured layer of a desired two-dimensional configuration to be superimposed on said preceding cured layer and substantially simultaneously forming said enclosure from said resin by irradiation of said light when forming each successive cured cross-sectional layer so as to increase a height of said enclosure by an increment of thickness which is substantially the same as that of the cured cross-sectional layer.

12. A process as set forth in claim 11, wherein said enclosure is integrally and horizontally connected to an outwardly projecting portion to be formed on said three-dimensional object by way of a bridge segment of segments, said bridge segment being formed commonly from said continuous coat of the liquid resin by irradiation of said light substantially simultaneously with forming of one or more of ht cured cross-sectional layers including said outwardly projecting portion.

13. In a process of fabricating a three-dimensional object from a light curable liquid resin of viscous nature by radiating a light to a top surface of said light curable liquid resin to form cure successive cross-sectional layers of the resin and superimposing said layers on each other, an improvement comprising:

surrounding an entire circumference of a preceding cured cross-sectional layer by means of an open top enclosure in a horizontally spaced relation thereto;

positioning a top end face of said enclosure at a horizontal level which is substantially the same as a top surface of the preceding cured cross-sectional layer each time an additional layer is to be formed on said preceding cured layer;

supplying said liquid resin across said preceding cured cross-sectional layer, said enclosure and into a space defined therebetween, and causing a portion of said liquid resin to overflow over an entire circumference of the top end face of said enclosure to thereby leave a continuous coat of said liquid resin extending horizontally from the top surface of said preceding cured layer to said top end face of said enclosure such that said continuous coat of said liquid resin is of a uniform thickness over an area extending from the top of said preceding cured layer to at least an inner periphery of said top end face of said enclosure; and irradiating said light to a selected portion of said continuous coat of the liquid resin to form thereat said additional cured layer of a desired two-dimensional configuration to be superimposed on said preceding cure layer, wherein said enclosure is integrally and horizontally connected to an outwardly projecting portion to be formed on said three-dimensional object by way of a bridge segment or segments, said bridge segment being formed commonly from said continuous coat of the liquid resin by irradiation of said light substantially simultaneously with forming of one or more of the cured cross-sectional layers including said outwardly projecting portion.

* * * * *